United States Patent
Kobayashi et al.

(10) Patent No.: US 7,039,925 B2
(45) Date of Patent: May 2, 2006

(54) DISK REPRODUCING DEVICE TO PREVENT FAULTY OPERATION IN LOADING OPERATION

(75) Inventors: Masaki Kobayashi, Hyogo (JP); Yoshinori Sonoda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 122 days.

(21) Appl. No.: 10/421,762

(22) Filed: Apr. 24, 2003

(65) Prior Publication Data
US 2003/0227857 A1    Dec. 11, 2003

(30) Foreign Application Priority Data
May 23, 2002    (JP) .............................. 2002-149761

(51) Int. Cl.
*G11B 17/04* (2006.01)

(52) U.S. Cl. ...................................................... 720/626
(58) Field of Classification Search ................ 720/622, 720/626
See application file for complete search history.

(56) References Cited

FOREIGN PATENT DOCUMENTS

JP          56-114168 A         9/1981

*Primary Examiner*—David Davis
(74) *Attorney, Agent, or Firm*—Sughrue Mion, PLLC (57) ABSTRACT

When a disk size selecting lever turns in a direction shown by an arrow A with an operation of ejecting a disk, its pushing surface pushes corner portion of a first slider rack in a state where it can not move, toward a direction shown by an arrow C. When the disk is completely ejected, the disk size selecting lever is returned in a direction shown by an arrow B by urging force of a coil spring and at the same time the first slider rack is forcibly returned to an original position by urging force of a coil spring.

2 Claims, 12 Drawing Sheets

DISK REPRODUCING DEVICE TO PREVENT FAULTY OPERATION IN LOADING OPERATION

BACKGROUND OF THE INVENTION

1. Field of the Invention

The present invention relates to a disk reproducing device for reproducing information recorded on an optical disk such as a compact disk, a laser disk and the like.

2. Description of the Related Art

Figure 11:
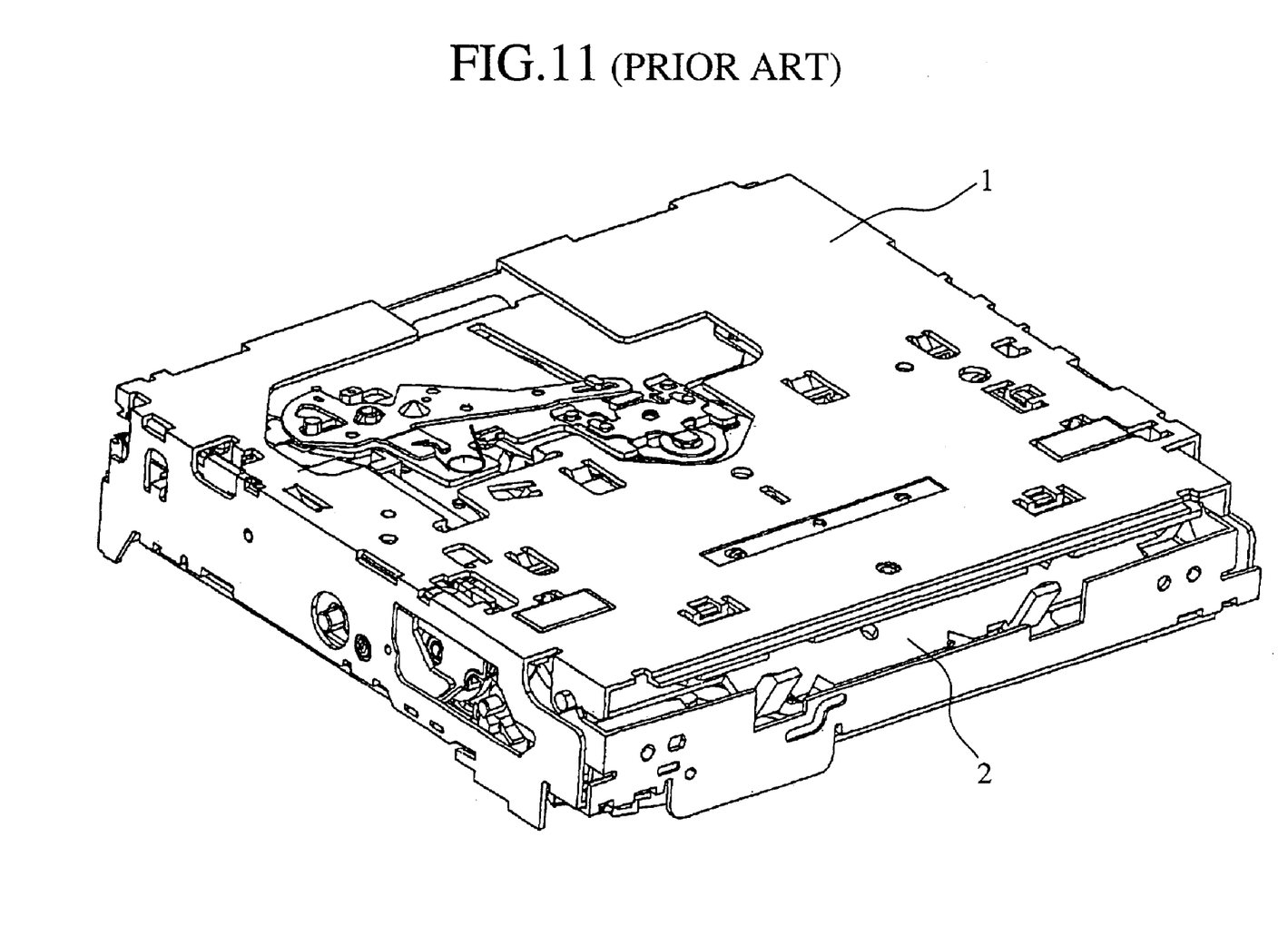
FIG. 11 is a schematic perspective view to show outside constitution of a conventional disk reproducing device.
Figure 12:
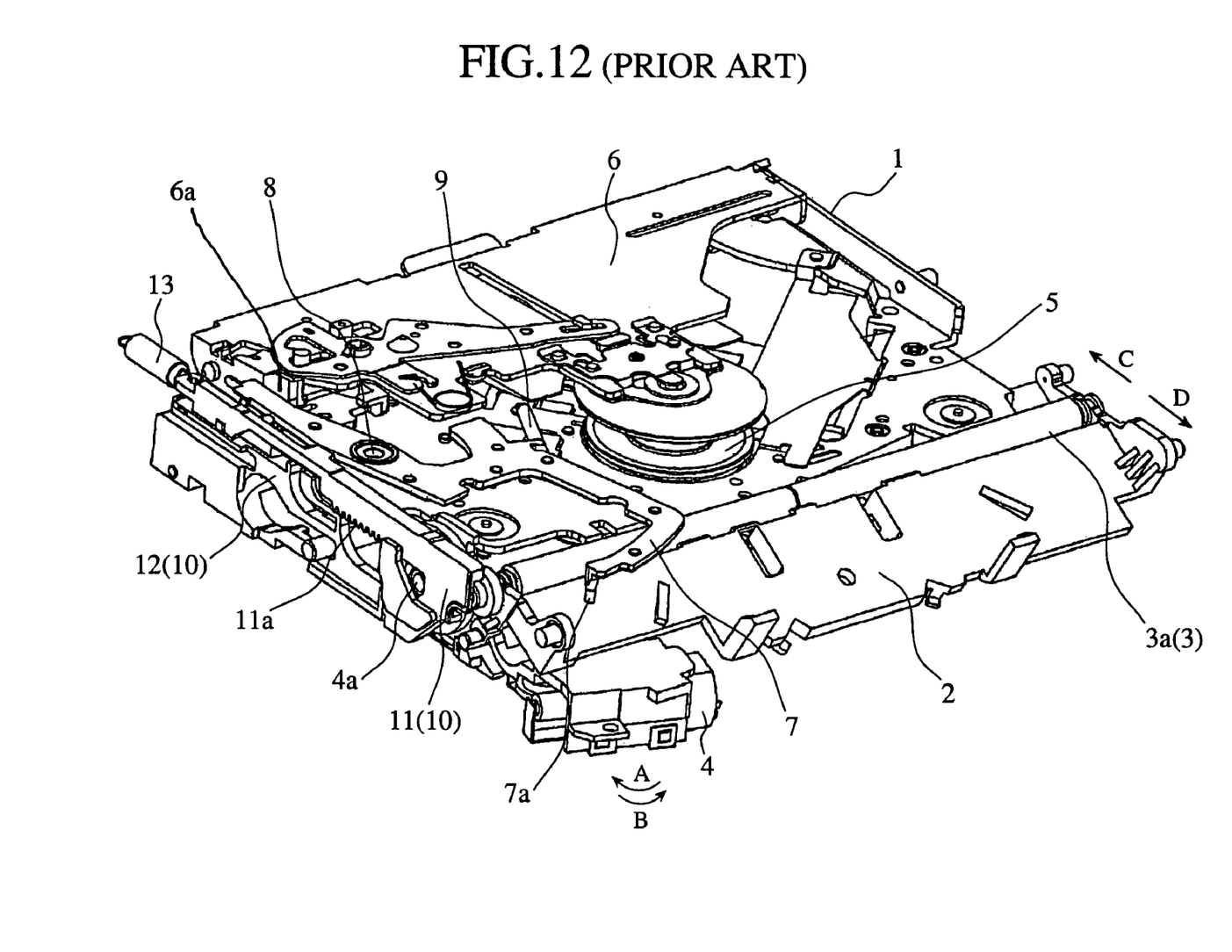
FIG. 12 is a schematic perspective view to show inside constitution of the conventional disk reproducing device shown in FIG. 11.

FIG. 11 is a schematic perspective view to show outside constitution of a conventional disk reproducing device and FIG. 12 is a schematic perspective view to show inside constitution of the conventional disk reproducing device shown in FIG. 11. Here, in the drawing, it is assumed that a lower right side is a front side and an upper left side is a rear side. In this respect, it is assumed that this relationship is common to the following respective perspective views.

In the drawings, a reference numeral 1 denotes a chassis to constitute box of a disk reproducing device, 2 denotes a disk inserting opening which is made in front side of the chassis 1 and through which a small-diameter disk such as 8 cm disk or a large-diameter disk such as 12 cm disk is inserted, 3 denotes a disk transfer part provided near the disk inserting opening 2, 4 denotes a disk transfer power transmitting part for supplying the disk transfer part 3 with a driving power, 5 denotes a disk reproducing part arranged near inside center of the chassis 1 and 6 denotes a clamp arm for fixing the disk to the disk the disk reproducing part 5.

A reference numeral 7 denotes a disk size selecting lever that turns at a swing angle varying according to size (outside diameter) of the disk inserted through the disk inserting opening 2 to change a clamp position by the clamp arm 6 in response to outside diameter of the disk. The disk size selecting lever 7 can turn in a direction shown by an arrow A and in a direction shown by an arrow B around a turning axis 8 which is fixed to the chassis 1. And a pin 7a sliding on outer peripheral portion of the disk is provided at tip of the disk size selecting lever 7. Moreover, the disk size selecting lever 7 is urged by a coil spring 9 so as to always turn in the direction shown by the arrow B and thus it stands by at a position biased to a maximum extent in the direction shown by the arrow B in preparation for transferring the disk.

A reference numeral 10 denotes a sliding member that moves to a front position away from its original position (not shown) to retract a disk transfer member (not shown) from near the disk in preparation for a clamping operation by the clamp arm 6 of clamping the disk transferred to the clamp position. The sliding member 10 is mainly constituted by a first slider rack 11 sliding in a front and rear direction near the disk inserting opening 2 and a second slider rack 12 sliding in a front and rear direction on an original position (not shown) side. The first slider rack 11 is a long member having a rack 11a which engages with gear 4a of the disk transfer power transmitting part 4. Between the chassis 1 and a rear end portion nearer to the original position of the first slider rack 11 is provided a coil spring 13 for always urging the first slider rack 11 backward on the original position side. The second slider rack 12 is also a long member having a rack (not shown) which engages with gear 4a of the disk transfer power transmitting part 4. Between the chassis 1 and a rear end portion nearer to the original position of the second slider rack 12 is provided a coil spring (not shown) for always urging the second slider rack 12 backward on the original position side.

Next, an operation of loading a disk (not shown) will be described.

First, when the disk is inserted through the disk inserting opening 2, motor (not shown) of the disk transfer power transmitting part 4 is activated by a sensor (not shown) which is mounted on a board (not shown). And transfer roller 3a of the disk transfer part 3 is rotated in a direction of loading the disk (in a direction shown by an arrow C in FIG. 12) by the rotational driving power. Thereby the disk is transferred into the device. When the disk is transferred, its outer peripheral portion abuts against pin 7a of the disk size selecting lever 7. When the disk is further transferred, the pin 7a slides on outer peripheral portion of the disk, so that the disk size selecting lever 7 turns at a predetermined swing angle in the direction shown by the arrow A around the turning axis 8. When the disk size selecting lever 7 turns at the predetermined swing angle, it pushes a disk centering member 6a arranged on the clamp arm 6. By this arrangement, the disk can be transferred to a centering position (clamp position) suitable for its size. When transfer of the disk is completed, a member (not shown) for detecting a completion of transferring the disk pushes the first slider rack 11 to retract the disk transfer member (not shown). When the first slider rack 11 moves forward by a predetermined distance from the original position, its rack 11a engages with gear 4a of the disk transfer power transmitting part 4 and further moves forward. When the first slider rack 11 moves in this manner, it pushes and moves down transfer roller 3a of the disk transfer part 3. At the same time when the first slider rack 11 moves forward by a predetermined distance, the second slider rack 12 for moving down the clamp arm 6 to the disk reproducing part 5 side also moves forward in cooperation with the first slider rack 11. When the second slider rack 12 moves forward, a locking member (not shown) for locking the disk reproducing part 5 turns to unlock the disk reproducing part 5, thereby the disk reproducing part 5 can be prevented from being vibrated with respect to the chassis 1 by an elastic member (not shown). When it is detected by means (not shown) for detecting a quantity of movement arranged at a loading completion position that the second slider rack 12 moves to the loading completion position, the power supplied by the disk transfer power transmitting part 4 is stopped and a series of loading operations are completed.

Next, an operation of ejecting the disk will be described.

When the disk reproducing device receives a direction of ejecting the disk (not shown), the first slider rack 11 and the second slider rack 12 are moved by power along a direction of ejection (in a direction shown by an arrow D in FIG. 12) supplied by the disk transfer power transmitting part 4. Here, the second slider rack 12 is moved to a position where its rack (not shown) is disengaged from gear 4a of the disk transfer power transmitting part 4 and after this position, it is moved to an ejection completion position of the second slider rack 12 by a push applied by the first slider rack 11, where it is released from the push applied by the first slider rack 11. After the first slider rack 11 is moved to a position where rack 11a of the first slider rack 11 is disengaged from gear 4a of the disk transfer power transmitting part 4, it is moved to the ejection completion position (original position) by urging force of the coil spring 13. The disk is transferred by power transmitted to the disk transfer part 3 from the disk transfer power transmitting part 4 and it is detected by a sensor (not shown) that the disk is moved to the ejection completion position and the power supplied by the disk transfer power transmitting part 4 is stopped.

However, the conventional disk reproducing device is constituted in a manner described above, so that it has the following problem. That is, at the time of the ejection operation, for example, the first slider rack 11 is constituted in such a way that it returns to the original position by urging force of the coil spring 13 after its rack 11a is disengaged from gear 4a of the disk transfer power transmitting part 4. However, there is a case where the first slider rack 11 can not return to the original position because a sliding load is increased by warp and wear of the first slider rack 11 caused by a comparatively high temperature inside the chassis 1 of the disk reproducing device or the coil spring 13 is decreased in a spring load. In such case, there is happened a problem that a faulty operation will occur at the timing of an operation of loading the next disk.

In this respect, in order to stably attain a return of the first slider rack 11, there is also a method of simply setting spring load of the coil spring 13 at a higher value, but this higher spring load results in increasing a load to other mechanism and thus increasing a possibility of causing an operation stop, so that this method can not be adopted.

SUMMARY OF THE INVENTION

This invention has been made to solve the problem described above, and the object of the present invention is to provide a disk reproducing device that can surely return a sliding member to an original position and prevent the occurrence of a faulty operation.

A disk reproducing device in accordance with the present invention includes a turning member that turns at a swing angle varying according to an outside diameter of a loaded disk and changes a clamp position according to the outside diameter of the disk; a sliding member that moves to a position away from its original position to retract a disk transfer member in preparation for an operation of clamping the disk transferred to the clamp position; and first urging means for urging the sliding member to the original position side, and it is characterized by that the turning member is provided with a pushing portion for pushing the sliding member toward the original position when the turning member turns in response to an operation of transferring the disk to be ejected.

As described above, according to the present invention, the turning member is provided with a pushing portion for pushing the sliding member toward the original position when the turning member turns in response to an operation of transferring the ejected disk, so that it is possible to produce an effect of forcibly returning the sliding member to the original position. This can produce an effect of surely stabilizing operation of the disk reproducing device. Further, since the pushing portion is provided on the existing turning member, it is possible to produce an effect of suppressing an increase in manufacturing cost without increasing the number of parts and the number of assembling man-powers.

DETAILED DESCRIPTION OF THE PREFERRED EMBODIMENTS

Hereinafter the preferred embodiments of the present invention will be described.

Preferred Embodiment 1

Figure 1:
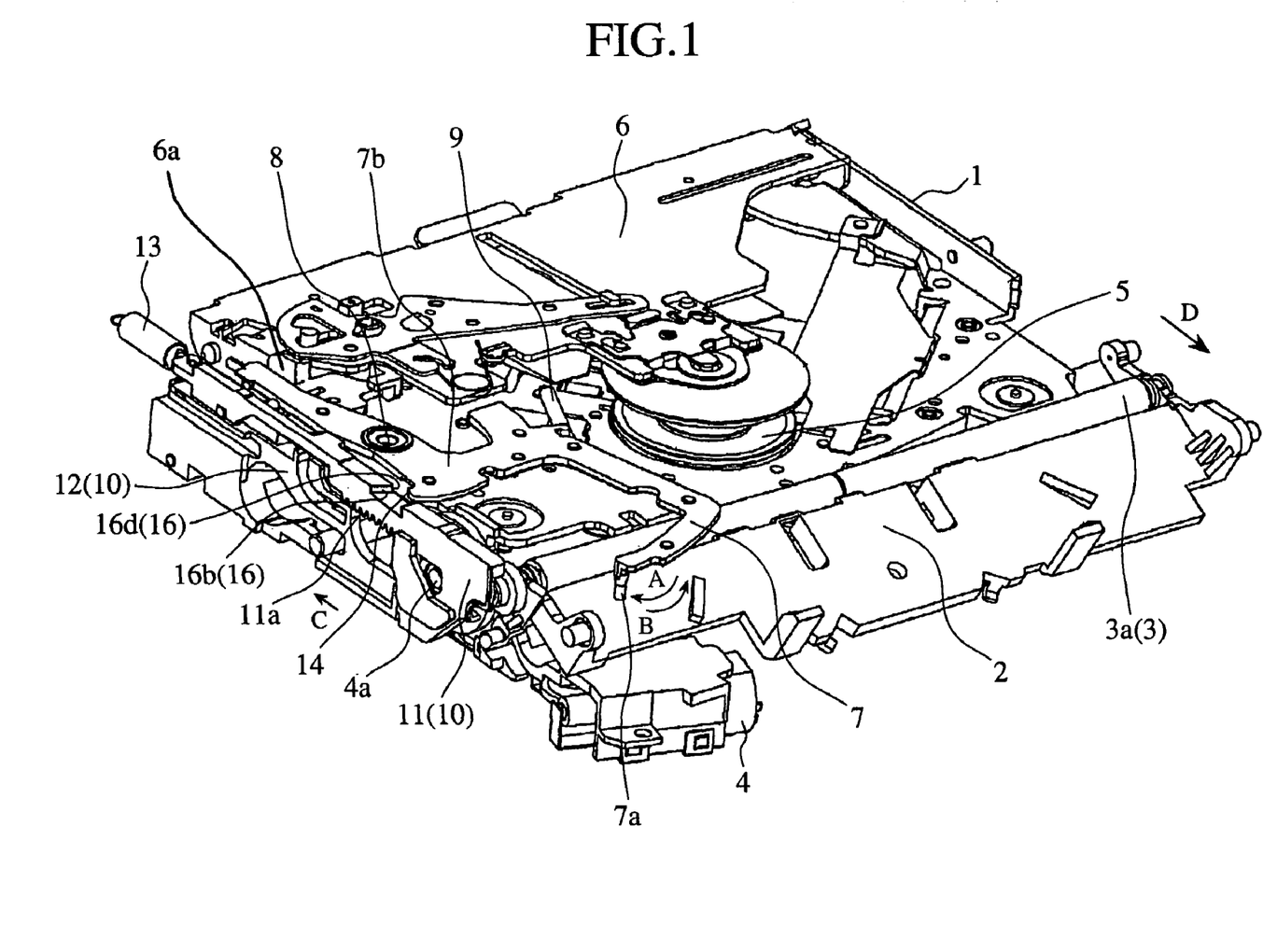
FIG. 1 is a schematic perspective view to show inside constitution of a disk reproducing device in accordance with embodiment 1 of the present invention.
Figure 2:
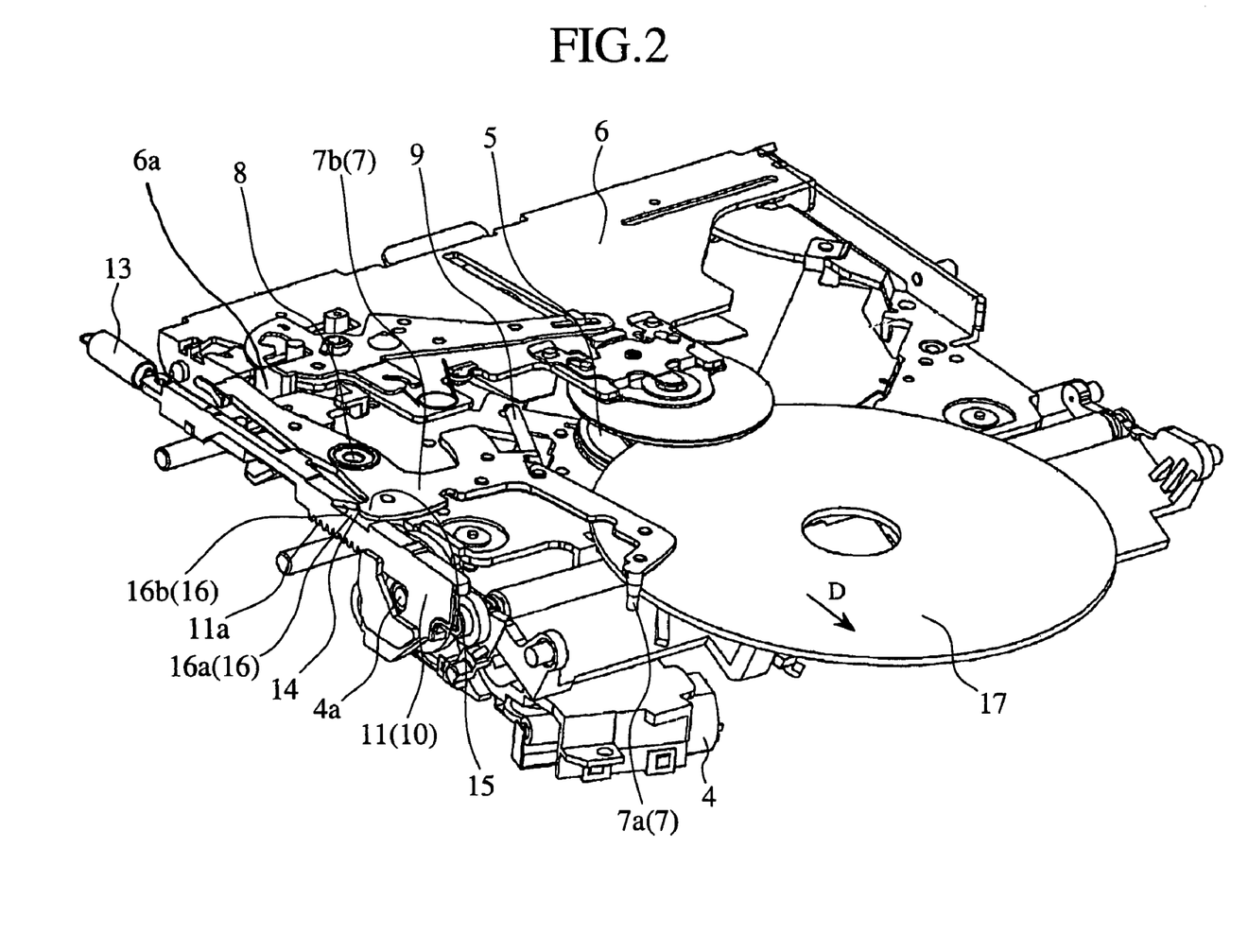
FIG. 2 is a schematic perspective view to show an operation of ejecting a small diameter disk in the disk reproducing device shown in FIG. 1.
Figure 3:
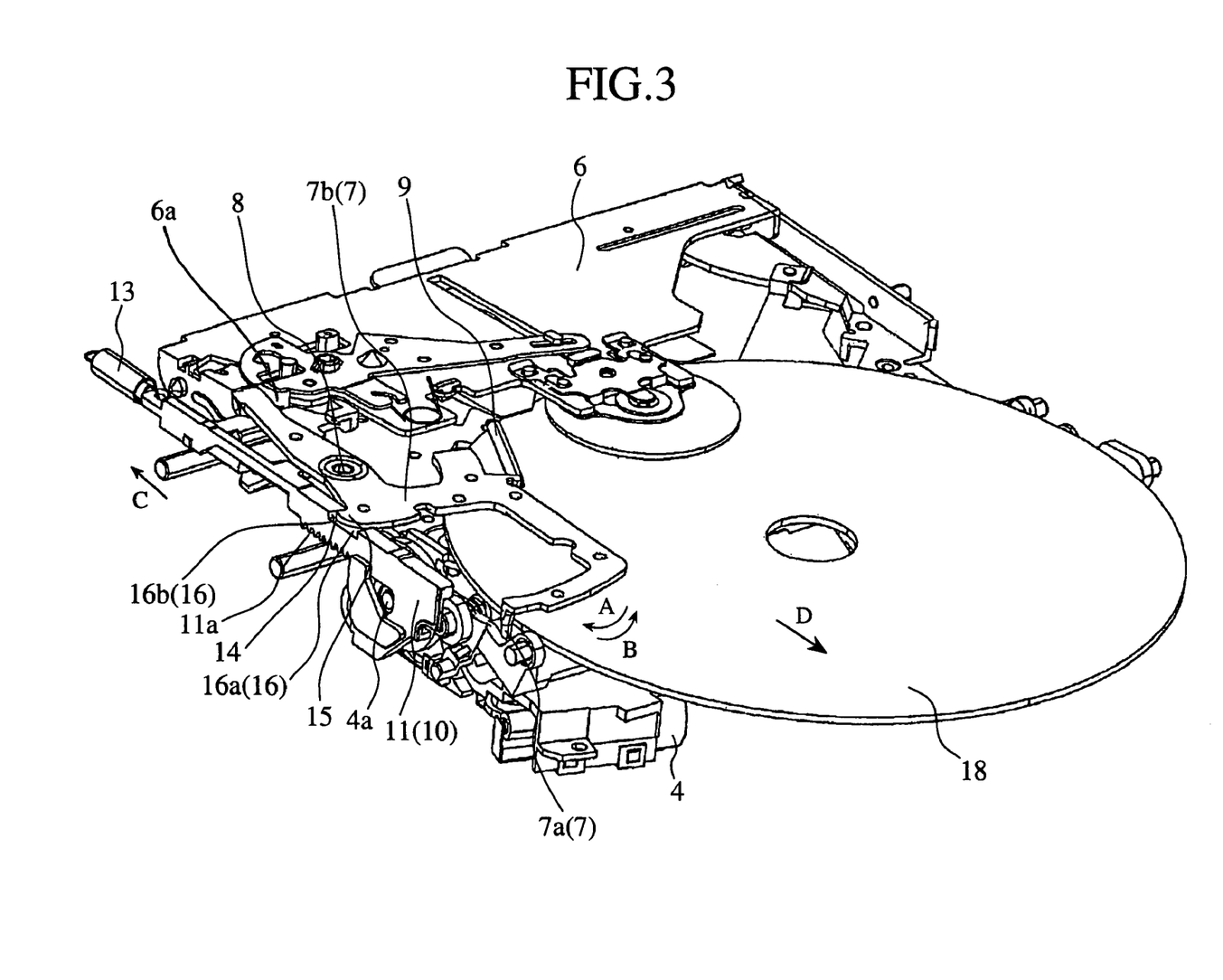
FIG. 3 is a schematic perspective view to show an operation of ejecting a large diameter disk in the disk reproducing device shown in FIG. 1.
Figure 4:
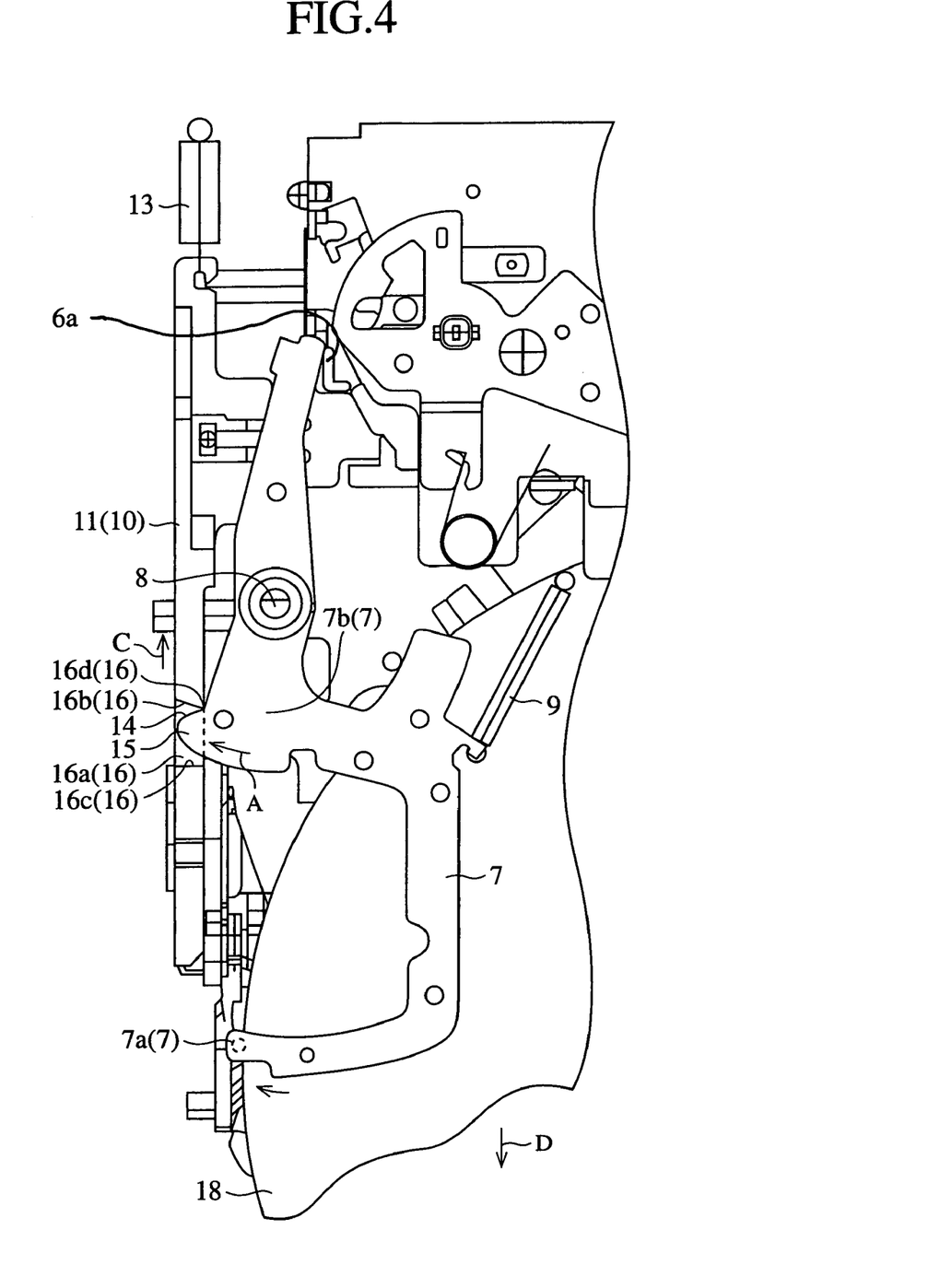
FIG. 4 is a schematic enlarged plan view to show the operation of ejecting a large diameter disk in the disk reproducing device shown in FIG. 3.
Figure 5:
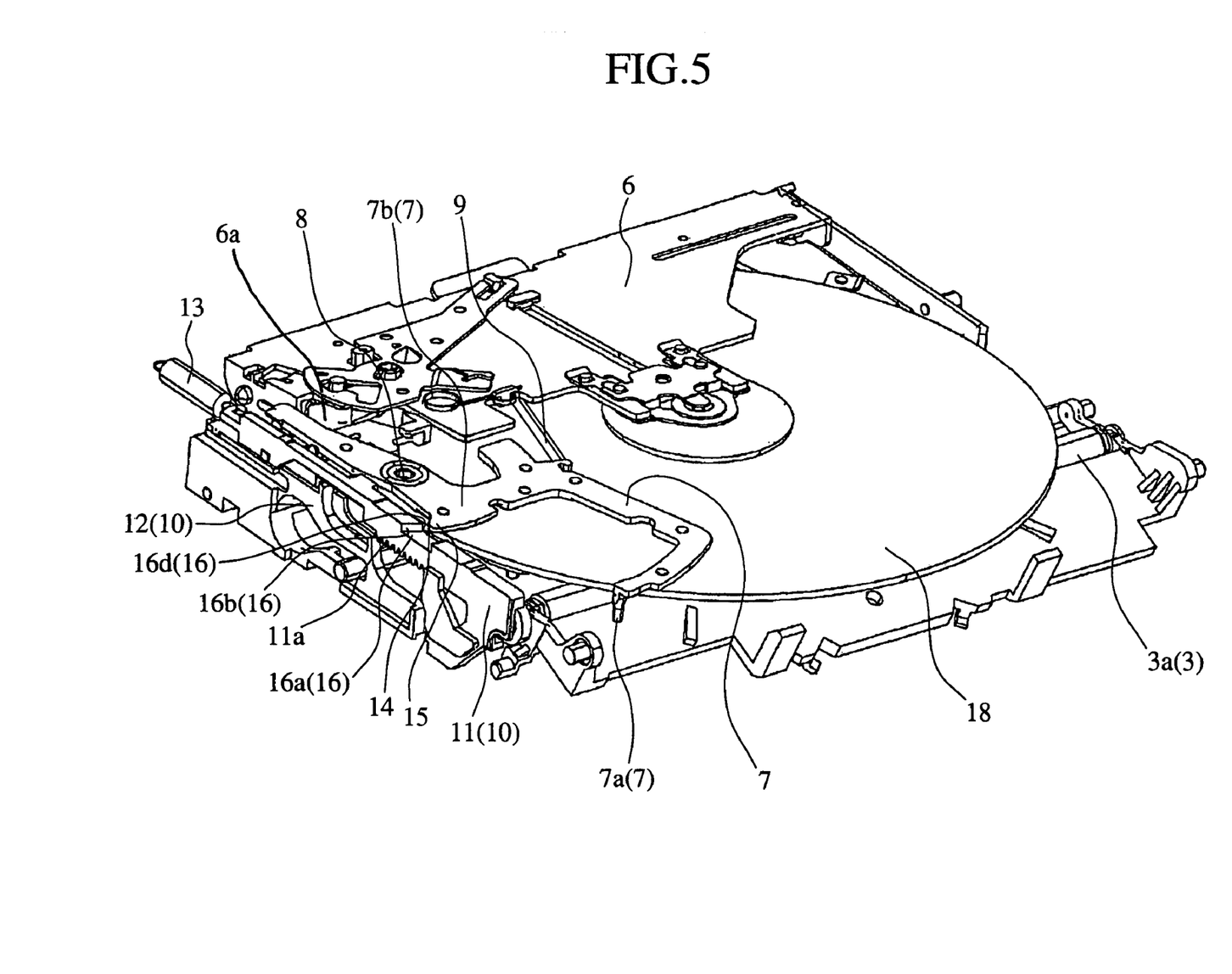
FIG. 5 is a schematic perspective view to show a state in which a large diameter disk is centered (clamped) in the disk reproducing device shown in FIG. 1.
Figure 6:
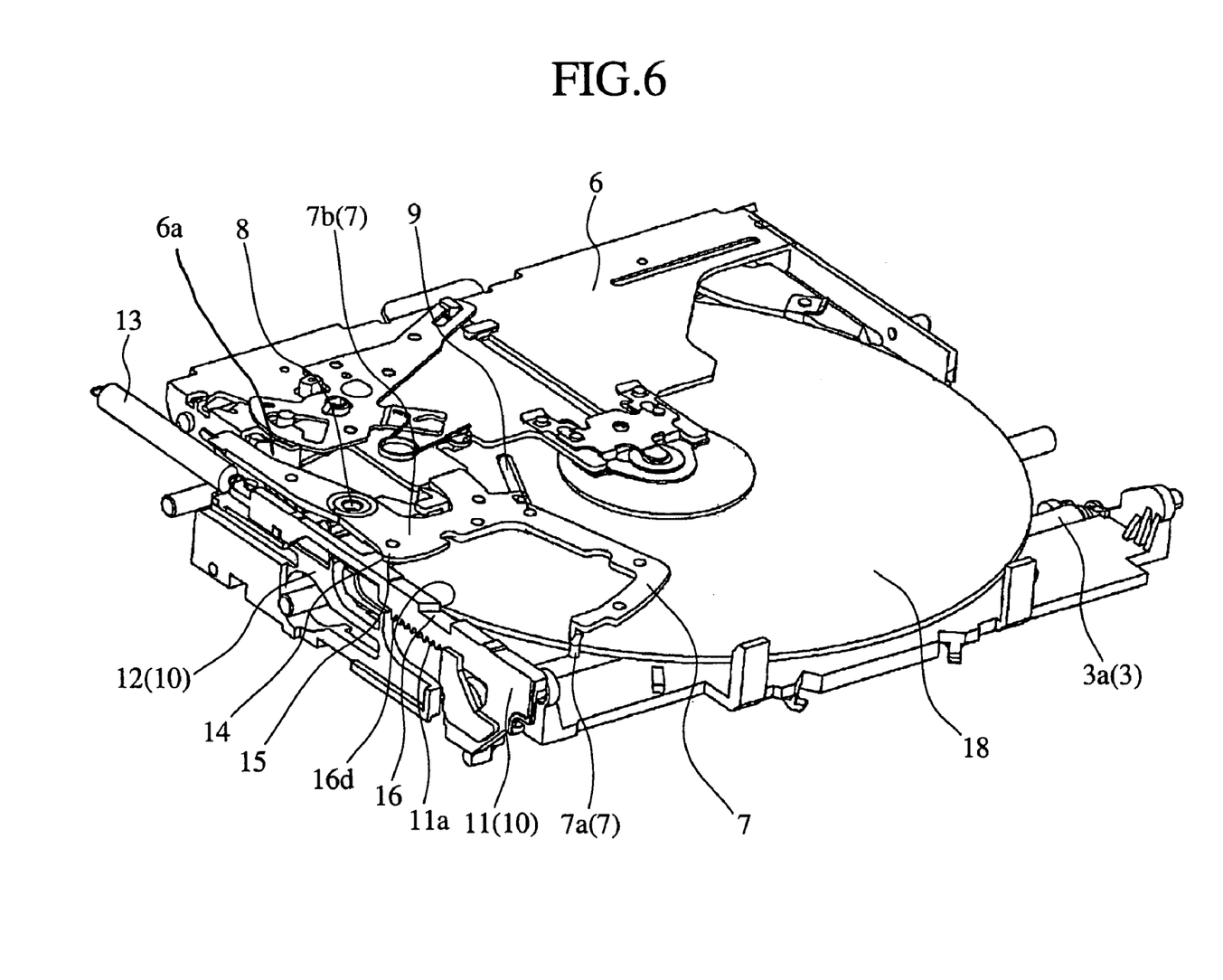
FIG. 6 is a schematic perspective view to show a state in which the large diameter disk clamped shown in FIG. 5 is reproduced.

FIG. 1 is a schematic perspective view to show inside constitution of a disk reproducing device in accordance with embodiment 1 of the present invention, FIG. 2 is a schematic perspective view to show an operation of ejecting a small diameter disk in the disk reproducing device shown in FIG. 1 and FIG. 3 is a schematic perspective view to show an operation of ejecting a large diameter disk in the disk reproducing device shown in FIG. 1. FIG. 4 is a schematic enlarged plan view to show an operation of ejecting a large diameter disk in the disk reproducing device shown in FIG. 3, FIG. 5 is a schematic perspective view to show a state in which a large diameter disk is centered (clamped) in the disk reproducing device shown in FIG. 1 and FIG. 6 is a schematic perspective view to show a state in which a large diameter disk clamped and shown in FIG. 5 is reproduced. At this point in the constituent elements of this preferred embodiment 1, elements common to the constituent elements of the conventional disk reproducing device shown in FIG. 11 and FIG. 12 are denoted by the same reference symbols and their further descriptions will be omitted.

The feature of this embodiment 1 lies in that a disk size selecting lever (turning member) 7 is provided with a pushing surface (pushing portion) 14 for pushing a first slider rack 11 in a direction shown by an arrow C which can not be returned to an original position even by urging force of a coil spring 13 and it is brought into a state of not moving, when the disk size selecting lever 7 turns at a timing of ejecting a disk.

The pushing surface 14 of the disk size selecting lever 7 in this preferred embodiment 1, for example, as shown in FIG. 4, is a convex curved surface for constituting surface of a protruding portion 15 protruding in a direction shown by an arrow A from outside bending portion 7b of the disk size selecting lever 7. On the other hand, under the assumption that the first slider rack 11 might be brought into a state where it can not move by the effects of high temperature in a chassis 1 and the like, is studied and found what position of the first slider rack 11 brought into the state where it can not move the pushing surface 14 of the disk size selecting lever 7 abuts against. Then, at the above mentioned position in upper portion of the first slider rack 11 is formed a through groove 16 made through in a direction of thickness of the first slider rack 11. The through groove 16, as shown in FIG. 4, is mainly constituted by a flat bottom surface 16a formed at a position lower than bottom surface of the disk size selecting lever 7, a rear wall surface 16b formed on original position side of the first slider rack 11, a front wall surface 16c formed on a disk inserting opening 2 side, and a corner portion 16d which is constituted by the rear wall surface 16b and inside wall surface of the first slider rack 11 and against which pushing surface 14 of the disk size selecting lever 7 abuts. The rear wall surface 16b is formed so as to retract from pushing surface 14 of the disk selecting lever 7 such that a distance between the rear wall surface 16b and the front wall surface 16c gradually increases outwardly in the direction of thickness of the first slider rack 11.

The relationship between pushing surface 14 of the disk size selecting 7 and corner portion 16d of through groove 16 of the first slider rack 11 is determined according to condition of a distance between a turning axis 8 as turning center of the disk size selecting lever 7 and the first slider rack 11 and the like, with a main view of effectively transferring an operation of turning the disk size selecting lever 7 to an operation of sliding the first slider rack 11. That is, in a case where the above-mentioned distance is short, an angle of intersection of a direction in which the first slider rack 11 slides (direction shown by the arrow C) and a direction in which the disk size selecting lever 7 turns (direction shown by the arrow A) or a direction of a tangent to a turning circle of the disk size selecting lever 7, becomes larger, so that it becomes difficult to transfer the operation of turning by the disk size selecting lever 7 to the operation of sliding by the first slider rack 11. On the contrary, in a case where the above-mentioned distance is long, the above-mentioned angle of intersection becomes smaller, so that it is easy to transfer the operation of turning by the disk size selecting lever 7 to the operation of sliding by the first slider rack 11. However, if a point where the disk size selecting lever 7 abuts against the first slider rack 11. It is possible to reduce effect of the above-mentioned angle of intersection. Thus, in this preferred embodiment 1, the disk size selecting lever 7 is set in such a way that its pushing surface 14 pushes corner portion 16d of the first slider rack 11 and this push makes it possible for the first slider rack 11 to be surely freed from the state where the first slider rack 11 can not move.

Moreover, the disk size selecting lever 7 varies in a swing angle according to outside diameter of a disk to be ejected. Thus, in this embodiment 1, as shown in FIG. 2, on the assumption that tip portion of the pushing surface 14 of the disk size selecting lever 7 abuts against corner portion 16d of the first slider rack 11 when a small diameter disk 17 having an outside diameter of 8 cm is ejected, the disk size selecting lever 7 is set in such a way that a root portion of pushing surface 14 of the disk size selecting lever 7 abuts against corner portion 16d of the first slider rack 11 even when a large diameter disk 18 having an outside diameter of 12 cm is ejected, as shown in FIG. 3.

Next, an operation will be described.

First, when the disk is ejected on an occasion where the first slider rack 11 stops in a state that it can not move at a position where rack 11a of the first slider rack 11 is disengaged from gear 4a of a disk transfer power transmitting part 4, as shown in FIG. 3, outer peripheral portion of the disk abuts against pin 7a of the disk size selecting lever 7 to turn the disk size selecting lever 7 in the direction shown by the arrow A with the operation of ejecting the disk. The pushing surface 14 of this disk size selecting lever 7 pushes corner portion 16d of the first slider rack 11 in the direction shown by the arrow C to slightly slide the first slider rack 11. At this time, when the disk is completely ejected and outer peripheral portion of the disk is separated from pin 7a of the disk size selecting lever 7, the disk size selecting lever 7 is returned in a direction shown by an arrow B by urging force of a coil spring (second urging means) 9 and the first slider rack 11 is forcibly returned to an original position by urging force of a coil spring (first urging means) 13.

In this respect, in a case where the disk is clamped, as shown in FIG. 5, or in a case where information of the disk is reproduced, as shown in FIG. 6, because the disk size selecting 7 stands by at a position where it is separated from the first sliding rack 11 by urging force of the coil spring 9, the pushing surface 14 of disk size selecting 7 and a protruding portion 15 do not prevent operation of a sliding member 10 including the first slider rack 11.

As described above, according to this preferred embodiment 1, the disk reproducing device is constituted such that the disk size selecting lever 7 is provided with the pushing surface 14 for pushing the first slider rack 11 toward the original position when the disk size selecting lever 7 turns in response to the operation of transferring the ejected disk, so that it is possible to produce an effect of forcibly returning the first slider rack 11 to the original position. This produces an effect of surely stabilizing operation of the disk reproducing device. Moreover, since the pushing surface 14 is provided on the existing disk size selecting lever 7, it is possible to produce an effect of suppressing an increase in a manufacturing cost without increasing the number of parts and the number of man-powers.

In this preferred embodiment 1, the disk reproducing device is provided with the coil spring 9 for urging the disk size selecting lever 7 in a direction of separating the disk size selecting lever 7 from the first slider rack 11 (direction shown by the arrow B), so that it is possible to produce an effect of preventing the disk size selecting lever 7 from colliding with the first slider rack 11 at the time of returning and surely returning the first slider rack 11 to the original position by separating the disk size selecting lever 7 from the first slider rack 11 at the timing at which the disk size selecting lever 7 pushes the first slider rack 11 to forcibly return it the original position.

Incidentally, while the through groove 16 is provided with the front wall surface 16c in this preferred embodiment 1, in order to prevent the disk size selecting lever 7 from colliding with the first slider rack 11 at a time of the returning operation, it is also recommended that front wall surface 16c of the through groove 16 be formed as farther away from the rear wall surface 16b as possible, or the front wall surface 16c be inclined with respect to the bottom surface 16a, or the front wall surface 16c be not provided.

Preferred Embodiment 2

Figure 7:
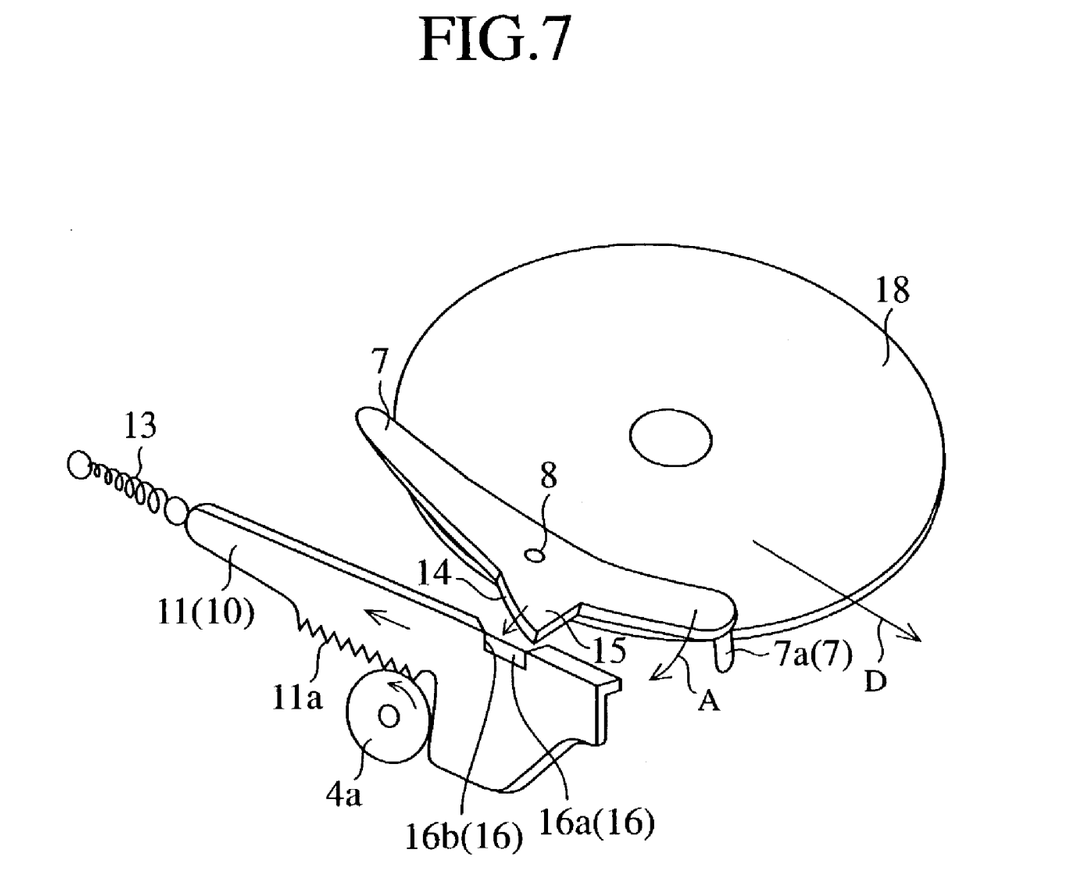
FIG. 7 is a schematic perspective view to show relevant part of a disk reproducing device in accordance with embodiment 2 of the present invention.
Figure 8:
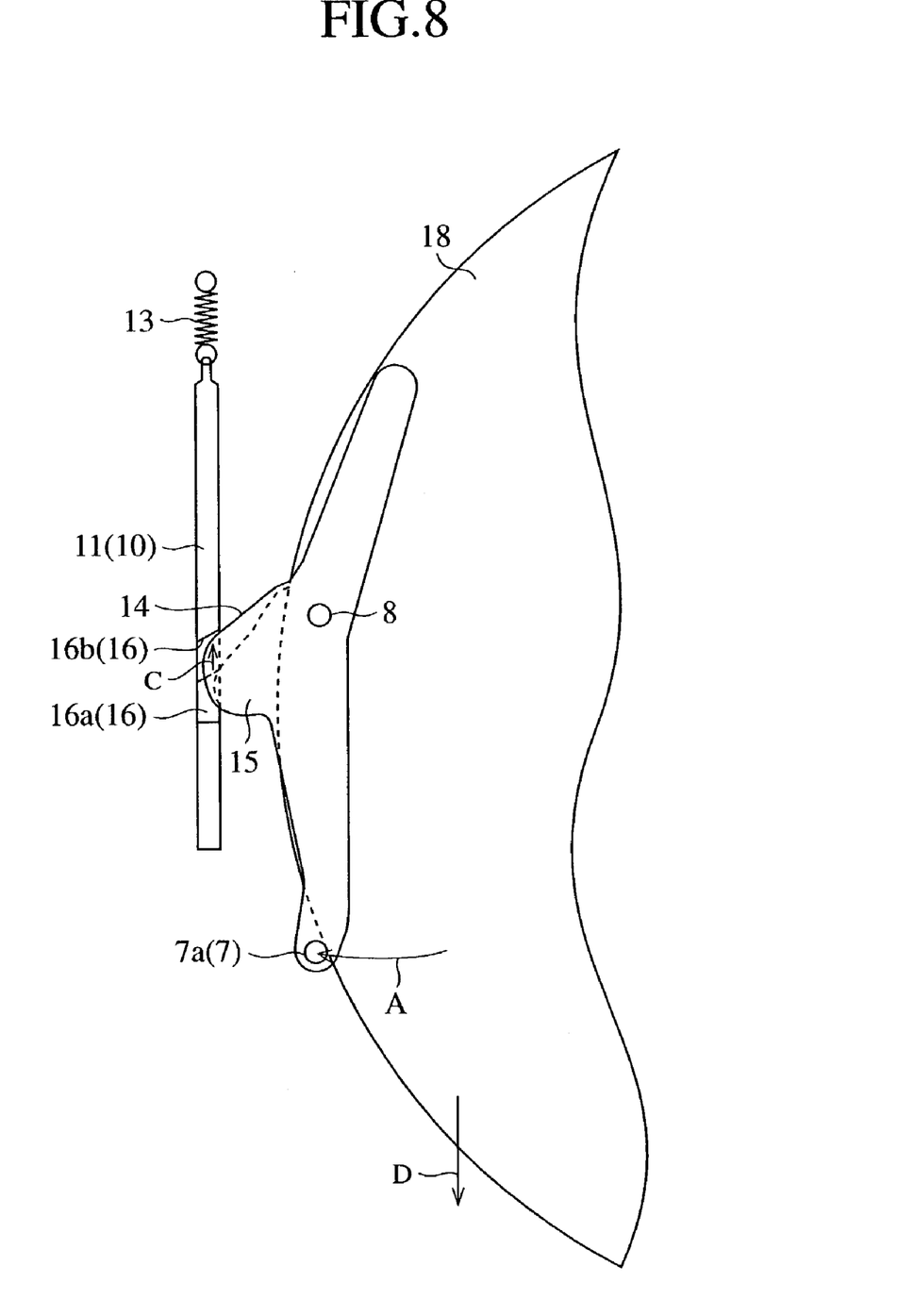
FIG. 8 is a schematic plan view to show relevant part of the disk reproducing device shown in FIG. 7.

FIG. 7 is a schematic perspective view to show relevant part of the disk reproducing device in accordance with embodiment 2 of the present invention, and FIG. 8 is a schematic plan view to show relevant part of the disk reproducing device shown in FIG. 7. Here, of the constituent elements of this preferred embodiment 2, elements common to the constituent elements of the preferred embodiment 1 are denoted by the same reference symbols and their further descriptions will be omitted.

A feature of this preferred embodiment is different from that of the preferred embodiment 1 and it lies in that the rear wall surface 16b is formed such that a distance between the rear wall surface 16b and the front wall surface 16c gradually increases inward in a direction of thickness of the first slider rack 11, as shown in FIG. 7 and FIG. 8.

In this preferred embodiment 2, when the disk size selecting lever 7 turns in a direction shown by an arrow A at the time when the disk is ejected, pushing surface 14 of the disk size selecting lever 7 abuts against the rear wall surface 16b of through groove 16 of the first slider rack 11, whereby the first slider rack 11 is pushed in a direction shown by an arrow C.

As described above, according to this preferred embodiment 2, the disk reproducing device is constituted such that pushing surface 14 of the disk size selecting lever 7 abuts against rear wall surface 16b of the first slider rack 11, so that it is possible to produce an effect of surely returning the first slider rack 11 to the original position.

Preferred Embodiment 3

Figure 9:
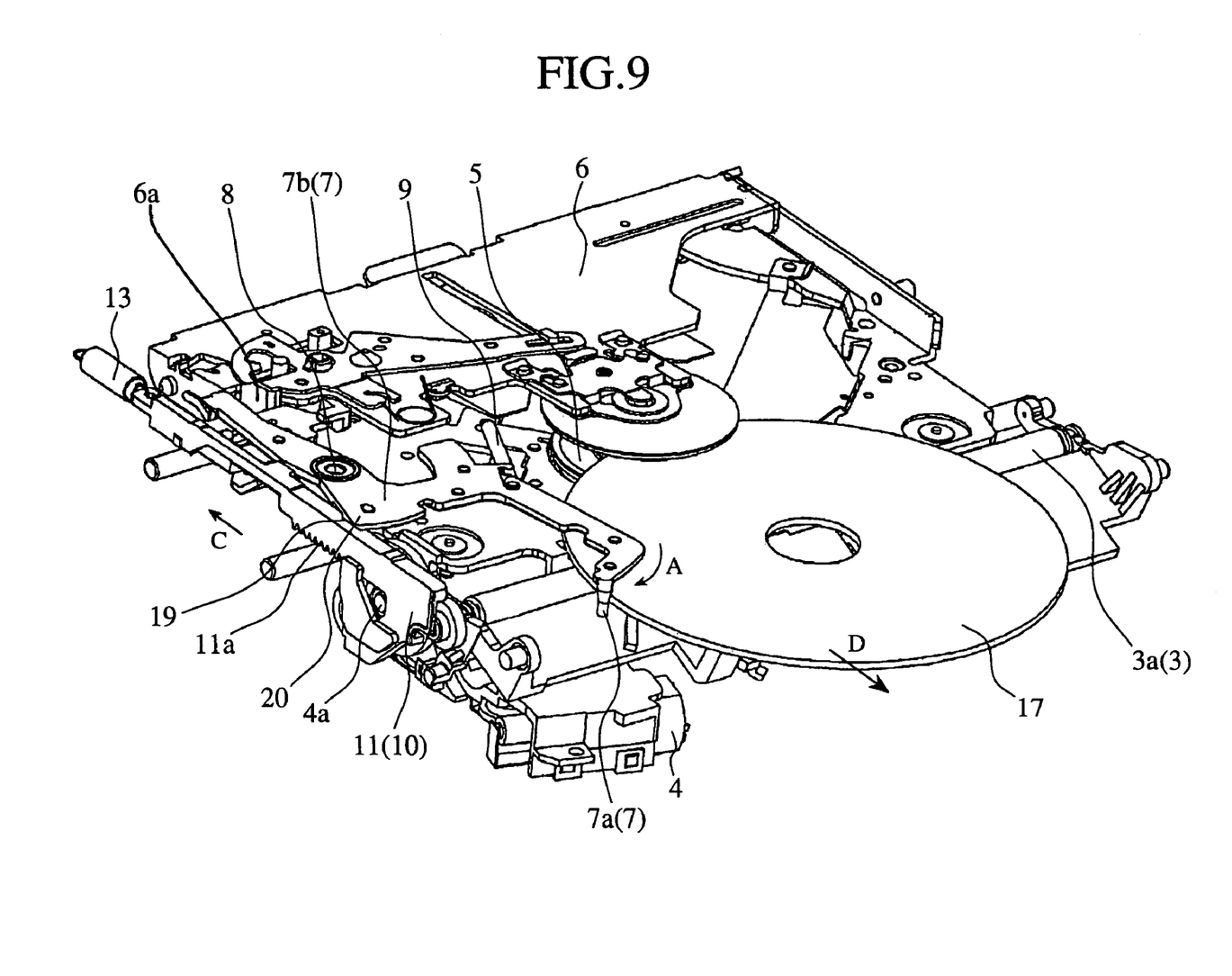
FIG. 9 is a schematic perspective view to show inside constitution of a disk reproducing device in accordance with embodiment 3 of the present invention.
Figure 10:
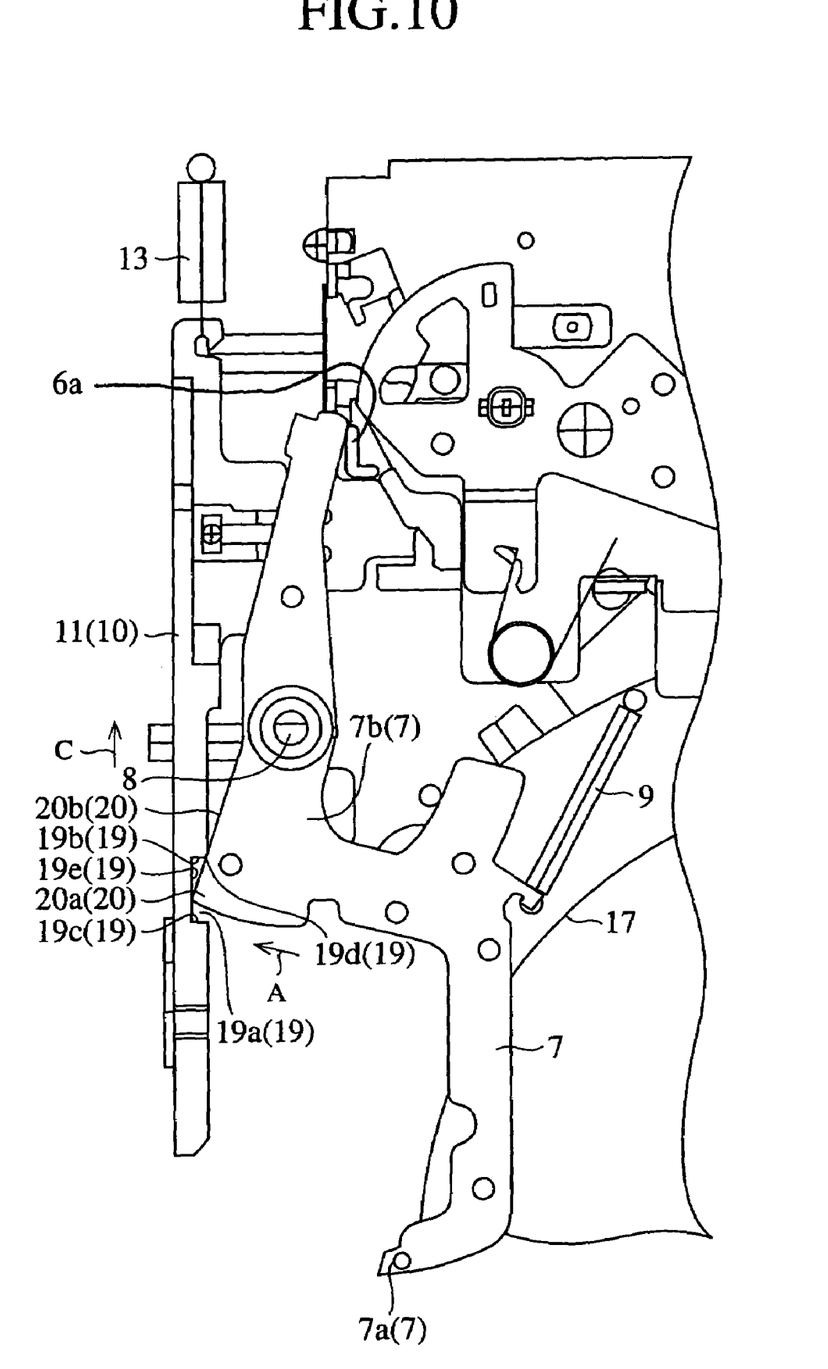
FIG. 10 is a schematic plan view to show relevant part of the disk reproducing device shown in FIG. 9.

FIG. 9 is a schematic perspective view to show inside constitution of a disk reproducing device in accordance with embodiment 3 of the present invention, and FIG. 10 is a schematic plan view to show relevant part of the disk reproducing device shown in FIG. 9. Here, of the constituent elements of this preferred embodiment 2, elements common to the constituent elements of the preferred embodiment 1 are denoted by the same reference symbols and their further descriptions will be omitted.

A feature of this preferred embodiment is different from those of the preferred embodiment 1 and the preferred embodiment 2 and it lies in that, in replace of the through groove 16, a concave portion 19 is provided at a position in upper portion of the first slider rack 11 where the disk size selecting lever 7 is to abut against the first slider rack 11 and that corner portion of bending portion 7b of the disk size selecting lever 7 makes a pushing portion 20. The concave portion 19, as shown in FIG. 9 and FIG. 10, is mainly constituted by a flat bottom surface 19a formed at a position lower than bottom surface of the disk size selecting lever 7, a rear wall surface 19b formed on the original position side of the first slider rack 11, a front wall surface 19c formed on a disk inserting opening 2 side, a corner portion 19d which is constituted by the rear wall surface 19b and inside wall surface of the first slider rack 11 and against which pushing portion 20 of the disk size selecting lever 7 abuts, and a central wall surface 19e formed between the rear wall surface 19b and the front wall surface 19c. On the other hand, pushing portion 20 of the disk size selecting 7 is mainly constituted by a pushing corner portion 20a formed outside the bending portion 7b and a pushing surface 20b formed adjacently to this pushing corner portion 20a.

In this preferred embodiment 3, as shown in FIG. 9 and FIG. 10, when the disk size selecting lever 7 turns in a direction shown by an arrow A at the time that the disk is ejected, the pushing corner portion 20a abuts against central wall surface 19e of concave portion 19 of the first slider rack 11 and the pushing surface 20b abuts against corner portion 19d of the concave portion 19, whereby the first slider rack 11 is pushed in a direction shown by an arrow C.

As described above, according to this preferred embodiment 3, the disk reproducing device is constituted such that pushing portion 20 of the disk size selecting lever 7 abuts against central wall surface 19e and corner portion 19d of concave portion 19 of the first slider rack 11, so that it is possible to produce an effect of surely making the disk size selecting lever 7 abut against the first slider rack 11 and thus surely returning the first slider rack 11 to the original position.

In this preferred embodiment, the first slider rack 11 is provided with the concave portion 19 which is smaller in the amount of cut than the through grooves 16 of the preferred embodiment 1 and the preferred embodiment 2, so that it is possible to produce an effect of keeping mechanical strength of the first slider rack 11.

In this respect, the concave portion 19 in this preferred embodiment 3 has the central wall surface 19e, so pushing portion 20 of the disk size selecting lever 7 can not penetrate through the first slider rack 11 in the direction of thickness. In a case where the distance between the turning axis 8 as a turning center of the disk size selecting lever 7 and the first slider rack 11 is short and an angle of intersection of a direction in which the first slider rack 11 slides (direction shown by the arrow C) and a direction in which the disk size selecting lever 7 turns (direction shown by the arrow A) or a direction of a tangent to turning circle of the disk size selecting lever 7 is large, there is a possibility that the pushing corner portion 20a abuts against central wall surface 19e of the concave portion 19 before pushing surface 20b of the disk size selecting lever 7 turning in the direction shown by the arrow A abuts against corner portion 19d of concave portion 19 of the first slider rack 11. In this case, the operation of turning the disk size selecting lever 7 might not be efficiently transferred to the operation of sliding the first slider rack 11. In order to avoid this, it is preferable that the distance between the turning axis 8 as turning center of the disk size selecting lever 7 and the first slider rack 11 be set long so that pushing portion 20 of the disk size selecting lever 7 abuts against only corner portion 19d of concave portion 19 of the first slider rack 11 or both the corner portion 19d and the central wall surface 19e at the same time.

What is claimed is:

1. A disk reproducing device comprising:
   a turning member that turns at a swing angle varying according to an outside diameter of a loaded disk and changes a clamp position according to the outside diameter of the disk;
   a sliding member that moves to a position away from its original position to retract a disk transfer member in preparation for an operation of clamping the disk transferred to the clamp position; and
   first urging means for urging the sliding member to the original position side,
   wherein the turning member is provided with a pushing portion for pushing the sliding member toward the original position when the turning member turns in response to an operation of transferring the disk to be ejected.

2. The disk reproducing device according to claim 1, further comprising second urging means for urging the turning member in a direction in which the turning member is separated from the sliding member.

* * * * *